(No Model.)
J. D. BOWLEY.
WHEEL FOR BICYCLES.
No. 598,850. Patented Feb. 8, 1898.
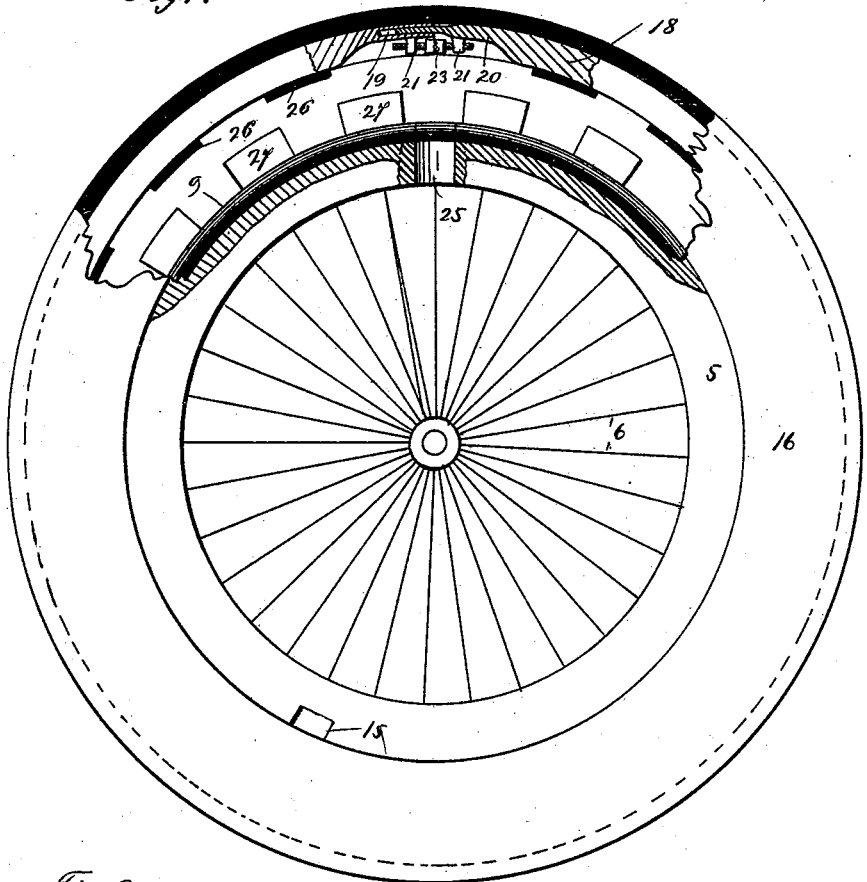
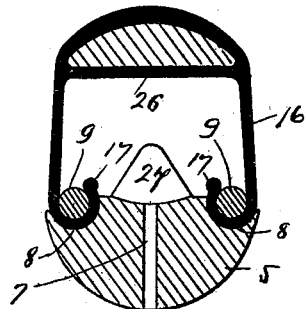
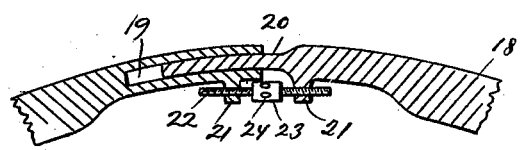
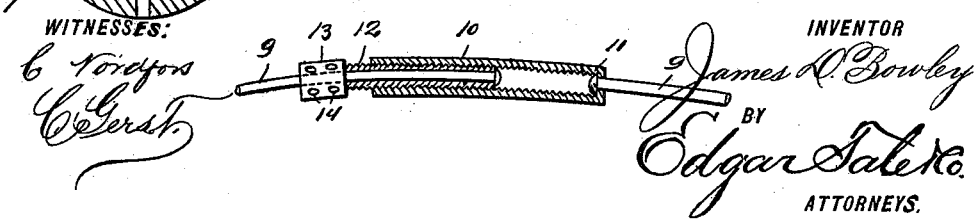
WITNESSES:
INVENTOR
James D. Bowley
BY Edgar Tate & Co.
ATTORNEYS.
THE NORRIS PETERS CO., PHOTO-LITHO., WASHINGTON, D. C.

UNITED STATES PATENT OFFICE.

JAMES DEAMESS BOWLEY, OF HOUSTON, TEXAS.

WHEEL FOR BICYCLES.

SPECIFICATION forming part of Letters Patent No. 598,850, dated February 8, 1898.

Application filed May 10, 1897. Serial No. 635,858. (No model.)

*To all whom it may concern:*

Be it known that I, JAMES DEAMESS BOWLEY, a citizen of the United States, residing at Houston, in the county of Harris and State 5 of Texas, have invented certain new and useful Improvements in Wheels for Bicycles and Similar Vehicles, of which the following is a full and complete specification, such as will enable those skilled in the art to which it appertains to make and use the same.

This invention relates to wheels for bicycles and similar vehicles, and particularly to the tires thereof; and the object of the invention is to provide an improved tire for this purpose which is adapted to take the place of a pneumatic tire and to operate in a similar manner.

The invention is fully disclosed in the following specification, of which the accompanying drawings form a part, in which—

Figure 1 is a side view of a bicycle-wheel constructed according to my invention, part of the construction being shown in section; Fig. 2, a cross-section of my improved tire and the rim of the wheel; and Figs. 3 and 4 are longitudinal sections of details of the construction, Fig. 3 being on an enlarged scale.

In the drawings forming part of this specification the separate parts of my improvement are designated by the same numerals of reference in each of the views, and in said drawings I have shown an ordinary bicycle-wheel provided with a rim 5, to which the spokes 6 are secured in the usual or any preferred manner, said rim being preferably provided with bores or passages 7, as shown in Fig. 2, through which the spokes are inserted or with which said spokes are connected.

The rim 5 is preferably of the form in cross-section shown in Fig. 2, the inner side thereof being convex and the outer side substantially flat, and formed in each edge of the outer sides of said rim is an annular groove 8, in each of which is secured a metal ring 9. These metal rings 9 are partially shown in Fig. 4 on a much smaller scale than in Fig. 2, and the ends thereof are connected by means of a sleeve 10, which is open at one end and closed at the other, and the interior of which is screw-threaded. One end of the rod or wire of which these rings 9 are composed is connected with the tubular sleeve or casing 10, as shown at 11, and the opposite end is provided with a casing 12, which is secured thereto and which is adapted to be screwed into the sleeve or casing 10, and said casing 12 is provided with a cylindrical head 13, in which is formed a plurality of holes or openings 14.

The rings 9, when connected with the rim 5 of the wheel, are stationary, and the said rim is provided where the couplings shown in Fig. 4 are made with pins 15, which are arranged adjacent to the heads 13, and a suitable tool may be inserted through these openings, so as to turn said head 13 and with it the casing 12, and thus the rings 9 may be tightened in the grooves 8.

My improved tire is shown at 16 and is composed of rubber, rubber and canvas, or other suitable material, and said tire is open throughout its length on the inner side thereof, and in practice the edges of the sides of the tire are passed beneath the rings 9, as shown at 17 in Fig. 2, and are securely grasped and held in place and in connection with the rim 5 by said rings 9, and the outer or bearing portion of the tire is provided with a reinforcing-strip 18, which may be composed of spring-steel, wood, or any suitable material, wood being preferred, and the ends of this strip are connected as shown in Fig. 3, one of said ends being provided with a socket 19 and the other with an extension 20, which is adapted to enter said socket, and formed on the inner surfaces of the adjacent ends are inwardly-directed lugs or projections 21, through which is passed a shaft 22, the ends of which are provided with oppositely-directed screw-threads, and said shaft is provided centrally with a hub 23, which is provided with radial holes or openings 24, and the rim 5 of the wheel is provided opposite the point where this connection is made with a large opening 25, through which a suitable tool or instrument may be passed for operating the shaft 22, so as to tighten or loosen the strip 18, when desired.

The reinforcing-strip 18 is mounted on the inner side of the bearing-surface of the tire and is held in place by transverse strips 26, which are formed integrally with said tire and formed on or secured to the outer portion of the rim 5. Between the rings 9 are shoulders or projections 27, which are of the form shown in Figs. 1 and 2, and which are intended to limit the inwardly-directed movement of the outer portion of the tire or to form a bearing therefor if under any circumstances the outer portion of said tire should be depressed. By means of this construction I provide a strong, substantial, and durable tire and one which will operate upon the principle of a pneumatic tire, and it will be apparent that the puncture of the body portion of the tire will not destroy the efficiency thereof.

It will be apparent that changes in and modifications of the construction herein described may be made without departing from the spirit of my invention or sacrificing its advantages; and, Having fully described my invention, I claim as new and desire to secure by Letters Patent—

In combination with a wheel for bicycles, and similar vehicles, a rim 5 provided on the outer surface thereof with two annular grooves 8, a metal ring 9 mounted in each of said grooves, the ends of each of said rings being connected by a sleeve 10 open at one end and closed at the other and means for operating said sleeves, a tire 16 mounted on said rim, said tire being composed of rubber or similar material, and being open on the inner side thereof, the edges being adapted to be engaged by said rings 9, in conjunction with the grooves of said rim, a peripheral reinforcing-strip 18 mounted on the inside of the bearing-surface of said tire, one end thereof being provided with a socket and the other being provided with a corresponding extension adapted to engage the same, each end of said reinforcing-strip being provided with inwardly-projecting lugs or projections 21, a shaft 22 mounted therein, said shaft being provided with oppositely-directed screw-threads and with a hub 23 having radial holes or openings 24, said rim being provided opposite the point where this connection is made with an opening 26 whereby suitable instruments may be inserted for operating the said shaft 22, said reinforcing-strips being held in place by transverse strips 26, substantially as and for the purpose described.

In testimony that I claim the foregoing as my invention I have signed my name, in presence of the subscribing witnesses, this 3d day of May, 1897.

JAMES DEAMESS BOWLEY.

Witnesses:
　EMERY BOYD BOYLE,
　IRA P. JONES.